United States Defensive Publication [19] (H) [11] T973,007

Beyers [43] Aug. 1, 1978

[54] REPLACEABLE TIRE TREAD BELT

[75] Inventor: Marvin E. Beyers, Peoria, Ill.

[73] Assignee: Caterpillar Tractor Co., Peoria, Ill.

[21] Appl. No.: 880,668

[22] Filed: Feb. 23, 1978

[51] Int. Cl.[2] ..... B60C 11/00

[52] U.S. Cl. ..... 152/176; 152/188; 152/209 A

[57] ABSTRACT

A replaceable tire tread belt has outer and inner peripheral surfaces and a pair of opposite side surfaces. The inner peripheral surface has a plurality of projections for interlocking engagement with a tire carcass, and the outer peripheral surface is axially divided into a smooth portion extending about the circumference and providing an extended service life, and a grooved portion extending about the circumference and defining the remaining portion of the outer peripheral surface and providing traction.

2 Claims, 1 Sheet Drawing,

7 Pages Specification

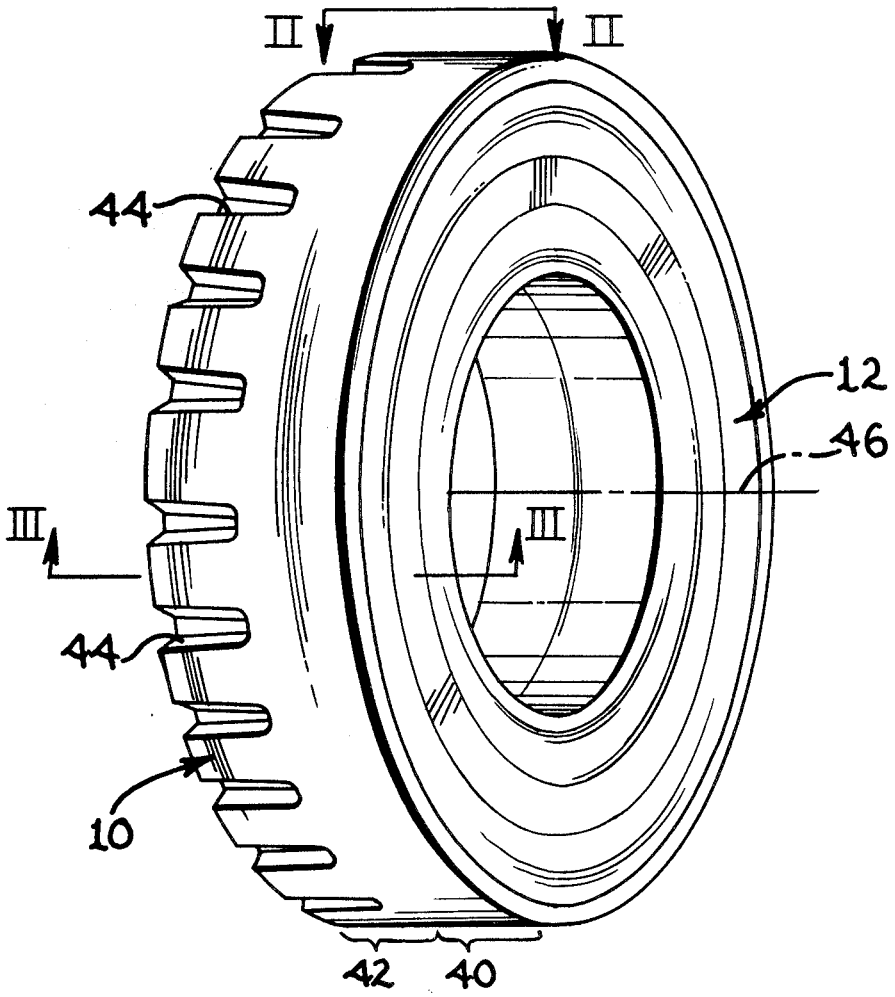

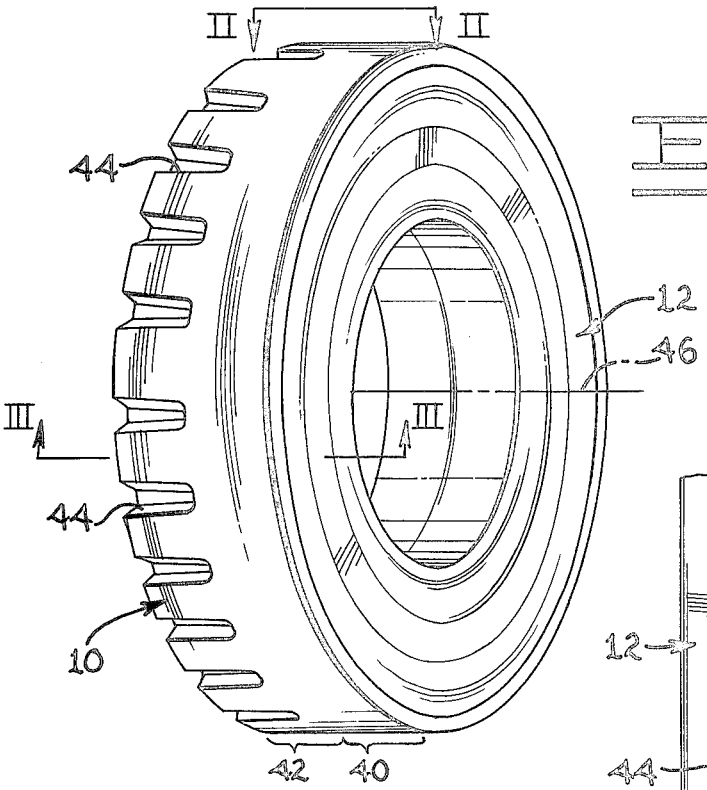
Fig. 1
Fig. 2
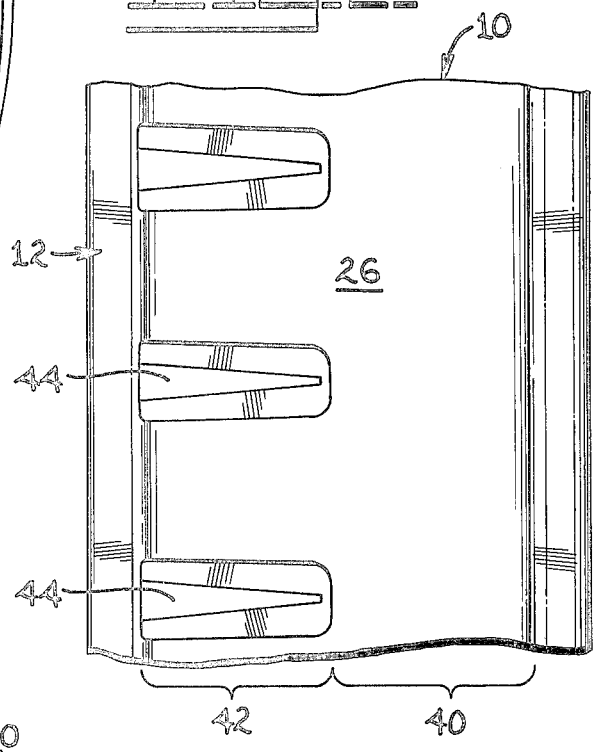
Fig. 3
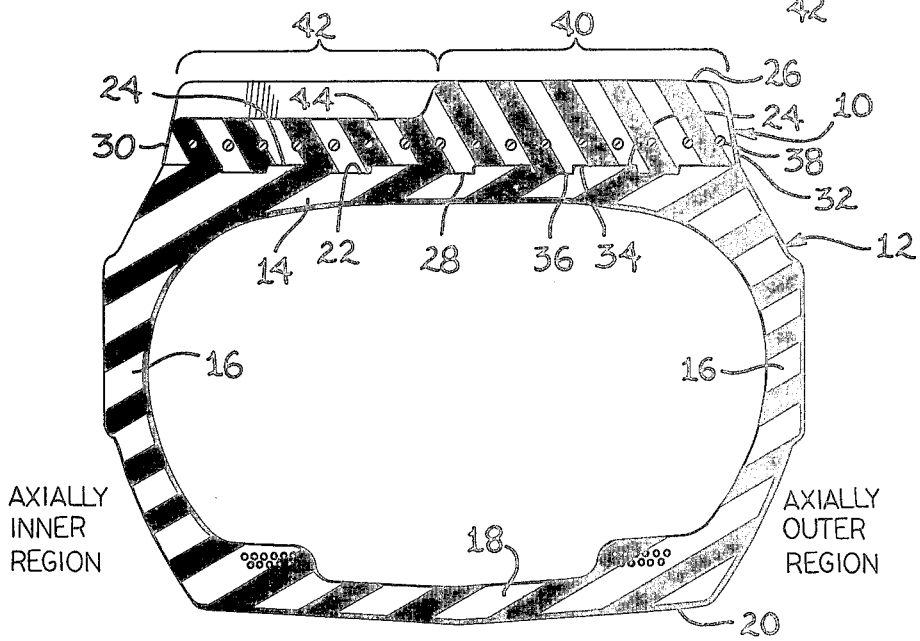

The file of this unexamined application may be inspected and copies thereof may be purchased (849 O.G. 1221, Apr. 9, 1968).